United States Patent
Imamura et al.

(10) Patent No.: US 7,535,487 B2
(45) Date of Patent: *May 19, 2009

(54) MEASURING INSTRUMENT FOR MEASURING VIDEO SIGNAL LEVEL AND DISPLAY DEVICE FOR DISPLAYING VIDEO SIGNAL LEVEL

(75) Inventors: Genichi Imamura, Yokohama (JP); Masaaki Nagai, Yokohama (JP); Takayuki Miyajiri, Yokohama (JP)

(73) Assignee: Leader Electronics Corporation, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/875,330

(22) Filed: Oct. 19, 2007

(65) Prior Publication Data

US 2008/0094475 A1   Apr. 24, 2008

Related U.S. Application Data

(63) Continuation of application No. 10/689,535, filed on Oct. 21, 2003, now Pat. No. 7,301,559.

(30) Foreign Application Priority Data

Oct. 23, 2002   (JP) ............................. 2002-308494

(51) Int. Cl.
*H04N 17/00* (2006.01)
(52) U.S. Cl. ...................... 348/185; 348/184
(58) Field of Classification Search ................ 348/722, 348/184, 175, 176, 187, 188, 71, 185; 345/440.1; 702/67–69
See application file for complete search history.

(56) References Cited

U.S. PATENT DOCUMENTS

| 4,707,727 | A | 11/1987 | Penney |
| 4,755,811 | A | 7/1988 | Slavin et al. |
| 4,768,089 | A | 8/1988 | Kato |
| 4,885,634 | A | 12/1989 | Yabe |
| 4,891,697 | A | 1/1990 | Saito |
| 5,078,150 | A | 1/1992 | Hara |
| 5,258,834 | A | 11/1993 | Tsuji |
| 5,374,965 | A | 12/1994 | Kanno |
| 6,289,115 | B1 * | 9/2001 | Takeo ......................... 382/130 |
| 6,349,373 | B2 * | 2/2002 | Sitka et al. .................. 711/161 |
| 6,678,703 | B2 * | 1/2004 | Rothschild et al. .......... 707/201 |
| 6,684,092 | B2 * | 1/2004 | Zavislan ..................... 600/407 |
| 7,034,867 | B2 | 4/2006 | Kurokawa |
| 7,097,615 | B2 * | 8/2006 | Banik et al. ................. 600/146 |
| 2003/0093503 | A1 | 5/2003 | Yamaki |

FOREIGN PATENT DOCUMENTS

| JP | 04-045690 | 2/1992 |
| JP | 09-261522 | 10/1997 |
| JP | 10-340133 | 12/1998 |
| JP | 2000-161945 | 6/2000 |

* cited by examiner

Primary Examiner—Victor R Kostak
(74) Attorney, Agent, or Firm—Fish & Richardson P.C.

(57) ABSTRACT

A measuring instrument is fed with a video output signal, and performs RGB processing on the video output signal to generate graphic data. A video signal level in the graphic data is measured and video signal level data is generated. Display data including the graphic data and the video signal level data is generated. A display device receives display data from the measuring instrument. The display data is visualized and an image and a video signal level are displayed.

17 Claims, 9 Drawing Sheets

Prior Art

MEASURING INSTRUMENT FOR MEASURING VIDEO SIGNAL LEVEL AND DISPLAY DEVICE FOR DISPLAYING VIDEO SIGNAL LEVEL

BACKGROUND OF THE INVENTION

The present invention relates to a measuring instrument for measuring a video signal level and a display device for displaying a video signal level. The present invention particularly concerns a waveform monitor for measuring a video signal level and a display device for communicating with the waveform monitor by wireless and displaying a video signal level.

For example, a video shooting process such as the production of TV programs and movies includes a process of illuminating an object with a lighting display device and shooting the object while adjusting the light source intensity of the lighting display device. As a method for confirming whether or not the light source of a lighting display device has a proper intensity, the following are available: a method for measuring a luminance of an illuminated object with a luminance meter, and a method for reading a video signal level by using a waveform monitor which receives a video output signal from a video camera for shooting an object.

In the latter method, a video camera and a lighting display device may be separated from each other. For example, a video camera may be positioned near the floor of a studio and a lighting display device may be positioned near the ceiling of the studio. In this case, the user of the lighting display device uses a long extension cable from the floor to the ceiling of the studio (connects the video output terminal of the video camera and the video input terminal of a waveform monitor via an extension cable), brings the waveform monitor close to the ceiling near the lighting display device, and adjusts the light source intensity of the lighting display device.

In this state, three problems arise as described below. A first problem is the difficulty of bringing a waveform monitor into a working space when the working space is small around the lighting display device. A second problem is that when two or more lighting display devices are provided, after the light source intensity of one of the lighting display devices is adjusted, both a waveform monitor and an extension cable need to be brought close to another lighting display device to adjust the light source intensity of the lighting display device. A third problem is degradation of a video output signal due to a long extension cable.

Figure 7A:
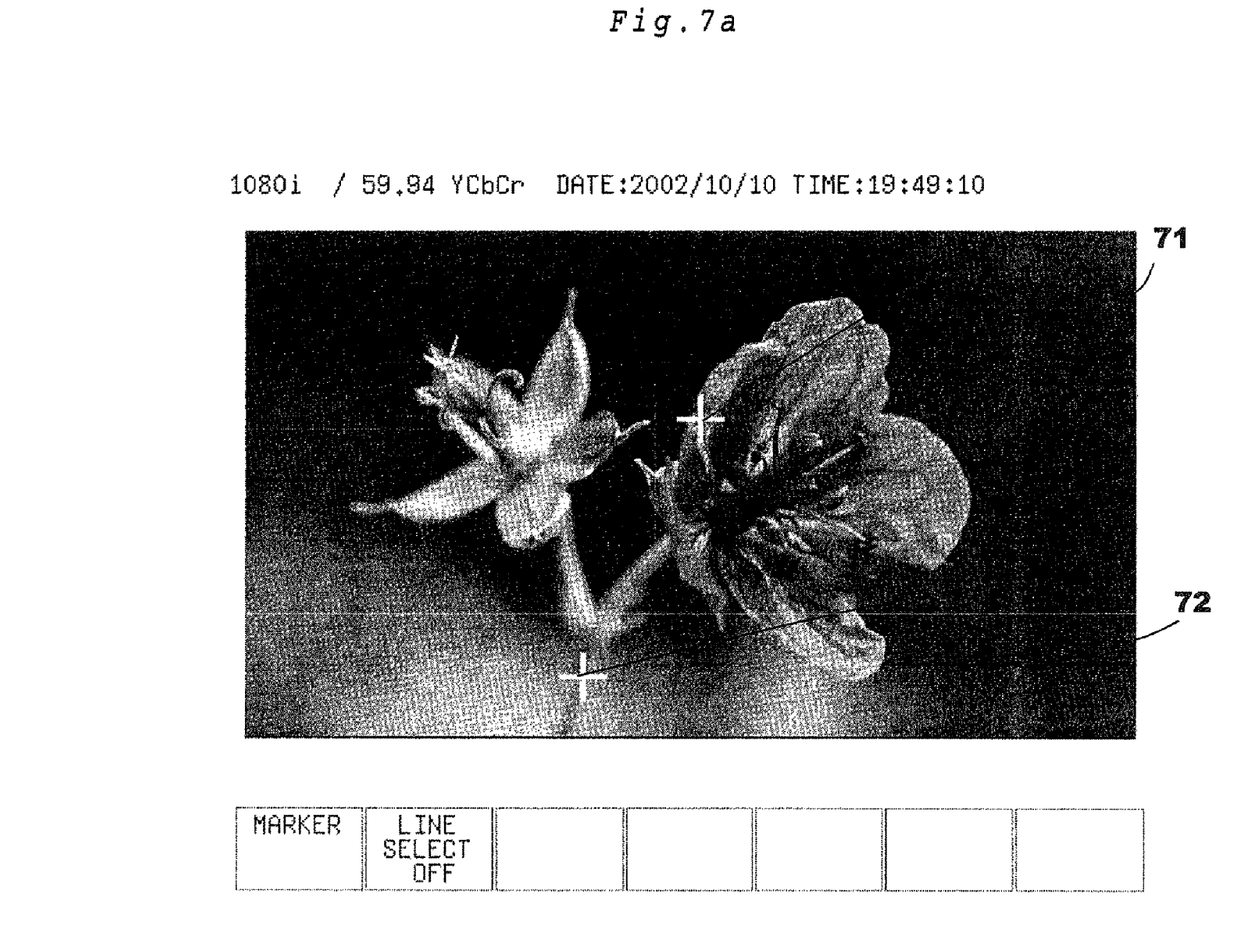
FIG. 7a is a view showing an example of an image.
Figure 7B:
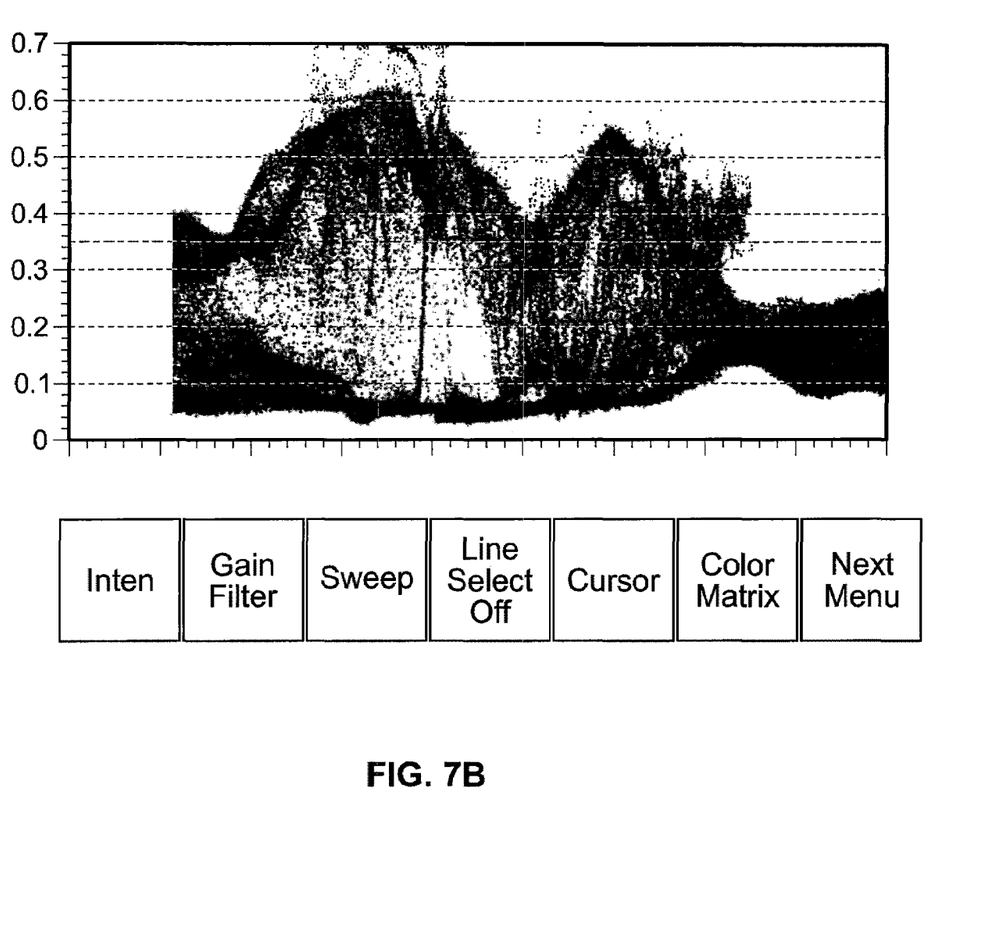

Furthermore, a fourth problem arises regardless of whether or not a video camera and a lighting display device are separated from each other. The problem is that only the skilled user can readily confirm a video signal level from waveforms shown on the display of a waveform monitor. Namely, only the skilled user can readily locate a required portion of complicated waveforms (waveforms including a luminance and color-difference information are superimposed on each line) shown in FIG. 7b, corresponding to the image of FIG. 7a, and read a luminance of one point (e.g., the position of "+" mark corresponding to reference numeral 71 or 72 of FIG. 7a) in the image while paying attention only to the required portion. In other words, it is difficult for the unskilled user to read a luminance of one point in an image while looking at the waveforms of FIG. 7b.

Moreover, a video shooting process frequently includes a process of shooting the same object two or more times. In this case, for example, it is necessary to match a video signal level of the first shooting with a video signal level of the subsequent shooting on the position of "+" mark corresponding to reference numeral 71 of FIG. 7a. Therefore, a fifth problem is that only the skilled user can readily match video signal levels while looking at the waveforms of FIG. 7b.

In the application, the applicant indicated Patent Document 1 as a related invention of the present invention.

[Patent Document 1]
Japanese Patent Laid-Open No. 10-340133 (pages 2 to 3, FIG. 2)

SUMMARY OF THE INVENTION

Figure 8:
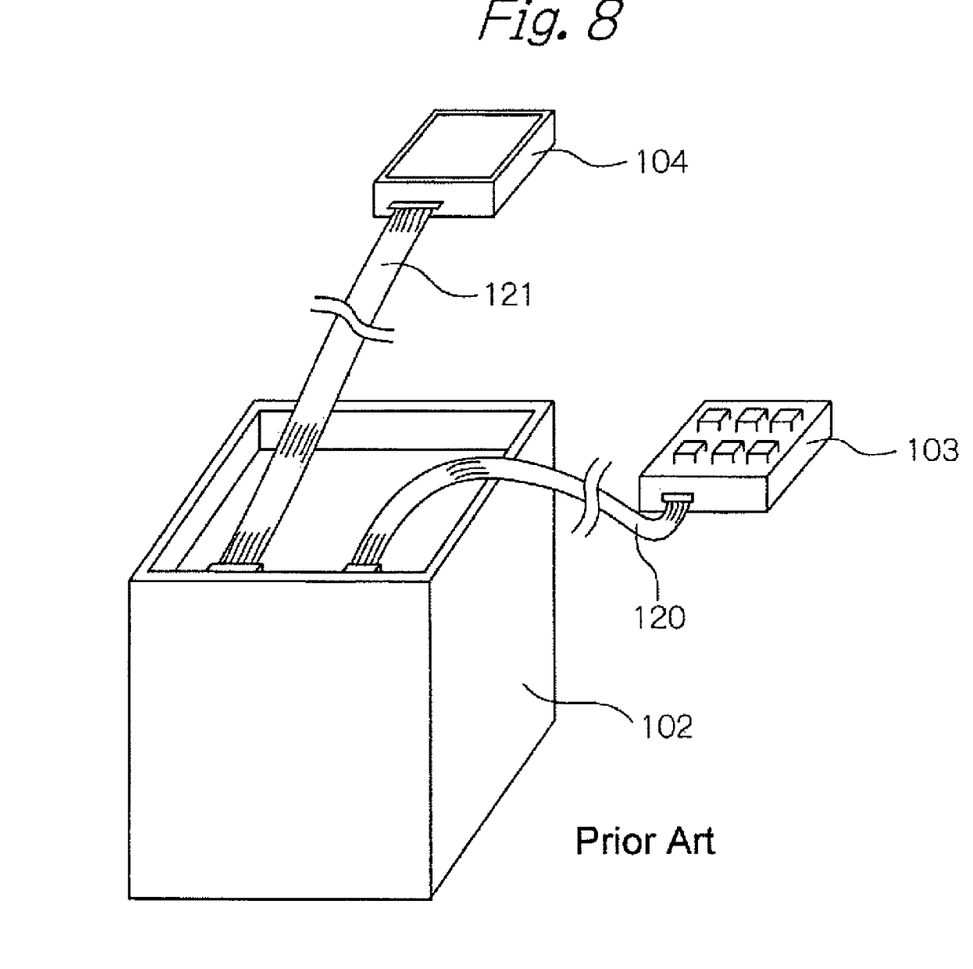
FIG. 8 is a diagram showing an example in which the conventional art described in Patent Document 1 is applied to a conventional waveform monitor.

In order to solve the above-described problems, it is considered that the conventional art of Patent Document 1 is applied to a conventional waveform monitor. In this case, as shown in FIG. 8, a display 104 and an operating part 103 of a waveform monitor 102 can be separated from the waveform monitor 102 by using extension cables 120 and 121.

In this way, the first problem can be relieved by adopting the conventional art of Patent Document 1 for the conventional waveform monitor. However, in the case of a small working space, it is still troublesome to bring in an extension cable. As with the first problem, it is also troublesome in the second problem to bring in an extension cable. The fourth and fifth problems-remain unsolved. The third problem is solved to a certain extent because a cable can be shorter between the video output terminal of a video camera and the video input terminal of the waveform monitor, resulting in relatively small degradation on a video output signal.

Therefore, an object of the present invention is to provide a display device and a method for readily adjusting the light source intensity of a lighting display device while using the function of a waveform monitor, even in the case of a small working space around the lighting display device.

Another object of the present invention is to provide a display device and a method for readily adjusting the light source intensity of a lighting display device even when a plurality of lighting devices are provided.

Still another object of the present invention is to provide a display device and a method for permitting the unskilled user to readily adjust the light source intensity of a lighting display device.

A measuring instrument of the present invention for measuring a video signal level comprises: a) means which is fed with a video output signal including a luminance signal and a color-difference signal from a video camera for shooting an object, and performs RGB processing on the video output signal to generate graphic data; b) means for measuring a video signal level on a position specified in the graphic data, and generating video signal level data; c) means for generating display data including the graphic data and the video signal level data; d) means for receiving position data corresponding to the position from a display device for displaying a video signal level; and e) means for transmitting the display data to the display device.

The measuring instrument of the present invention further comprises f) means for deciding whether the video signal level is within a predetermined range and generating decision data, and the means c) generates the display data further including the decision data.

A display device of the present invention for displaying a video signal level comprises: a) means for receiving display data including graphic data and video signal level data from a measuring instrument for measuring a video signal level; b) means for visualizing the display data and displaying an image and a video signal level; c) means for specifying a position in the displayed image and generating position data; and d) means for transmitting the position data to the measuring instrument.

In the display device of the present invention, the means a) receives the display data further including decision data indicating whether the video signal level is within a predetermined range, and the means b) visualizes the display data further including the decision data and also displays a decision.

BRIEF DESCRIPTION OF THE DRAWINGS

FIG. 7b is a view showing an example of a waveform corresponding to the image of FIG. 7a.

DETAILED DESCRIPTION OF THE INVENTION

The following will describe embodiments of the present invention with reference to the accompanying drawings.

Embodiment 1

Figure 1:
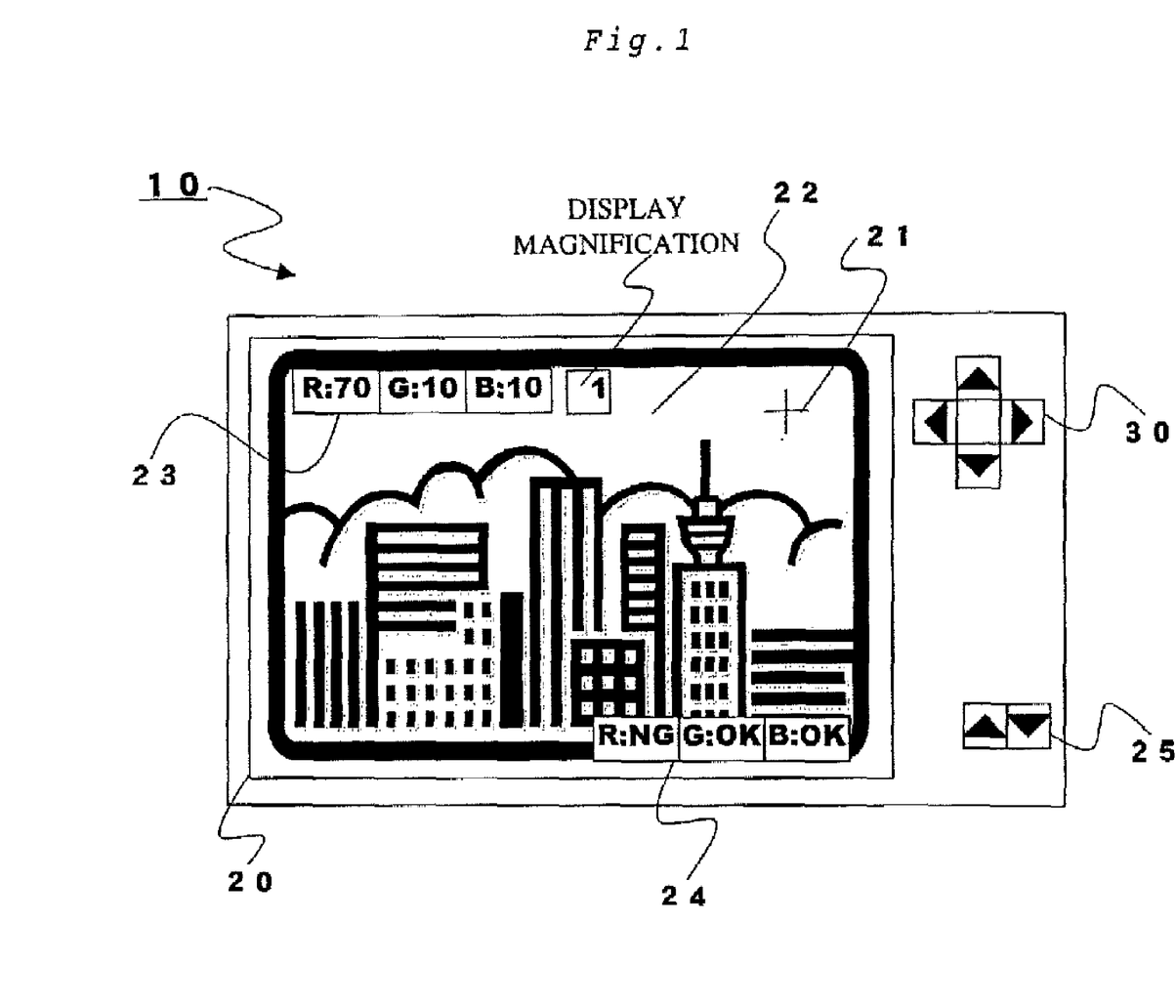
FIG. 1 is a view showing an example of a display area and specifying means of a display device which communicates with a measuring instrument by wireless and displays a video signal level according to the present invention.
Figure 2:
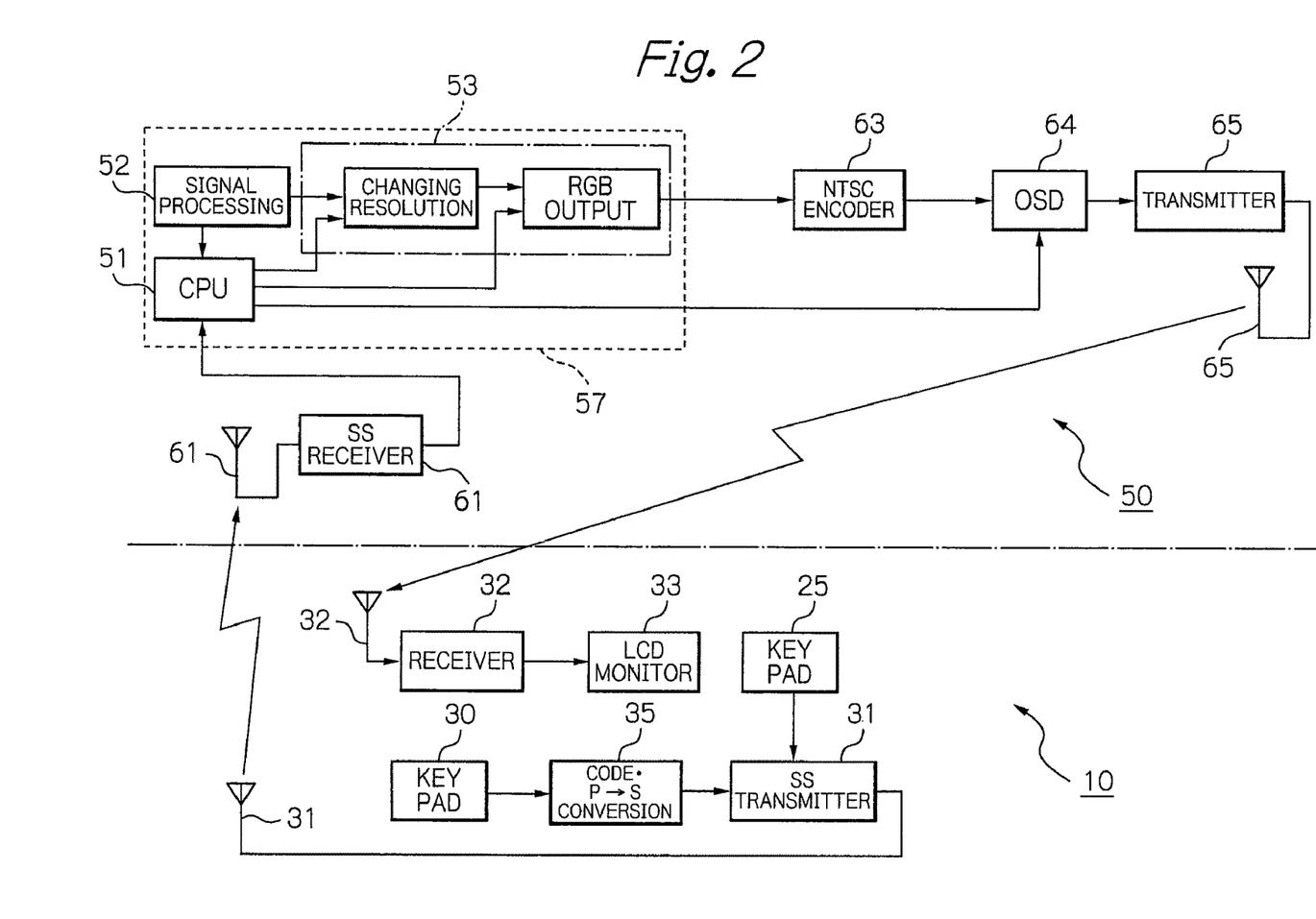
FIG. 2 is a diagram showing an example of the functional blocks of the measuring instrument and the display device for displaying a video signal level according to the present invention.

FIG. 1 is a view showing an example of a display area and specifying means of a display device according to the present invention. The display device displays a video signal level by communicating with a measuring instrument by wireless. FIG. 2 is a diagram showing an example of the functional blocks of the measuring instrument and the display device for displaying a video signal level according to the present invention.

As shown in FIGS. 1 and 2, a display device 10 for displaying a video signal level according to the present invention comprises: a) specifying means 30 for specifying an arbitrary position 21 on an image 22 displayed in a display area 20 and generating position data; b) transmitting means 31 for transmitting position data to the measuring instrument 50 by wireless; c) receiving means 32 for receiving graphic data, video signal level data corresponding to the position 21, and pointer data corresponding to the position 21 from the measuring instrument 50 by wireless; and d) display means 33 for visualizing graphic data, video signal level data, and pointer data and displaying the image 22, a video signal level 23, and a pointer 21 in the display area 20.

Further, the display device 10 of the present invention comprises e) signal converting means 35 which converts the codes of position data corresponding to the position 21 specified by the specifying means 30 to generate line number data and horizontal time data that indicate a position on a video signal, and thereafter performs P/S conversion to convert parallel data to series data.

Moreover, the display device 10 may comprise f) input means 25 which specifies a magnification for displaying graphic data and generates magnification data.

Meanwhile, as shown in FIG. 2, the measuring instrument 50 comprises: a') receiving means 61 for receiving data such as position data and magnification data from the display device 10 by wireless; b') a signal processing circuit 52 for inputting video output signals including a luminance signal (Y), a first color-difference signal (Cr), and a second color-difference signal (Cb) from a video camera for shooting an object, and performing RGB processing on the video output signals to generate graphic data; c') control means 51 which serves as control means for controlling the operation of the measuring instrument 50, measures a video signal level of a position specified in graphic data, generates video signal level data, decides whether or not the video signal level is within a predetermined range, and generates decision data; d') image processing means 53 for properly changing the resolution of graphic data as necessary by enlargement or the like to generate graphic data of NTSC timing: e') an NTSC encoder 63 for encoding graphic data in an NTSC format; f') an OSD 64 (On Screen Display) which is fed with character data such as image signal level data and decision data to generate image data corresponding to the character data, and superimposes the image data on graphic data to generate display data: and g') transmitting means 65 for transmitting display data to the display means 10 by wireless. A measuring section 57 includes the control means 51, the signal processing circuit 52, and the image processing means 53.

The following will specifically describe the operations of the display device 10 and the measuring instrument 50 according to the present invention.

First, the user of the display device 10 operates the specifying means 30 (e.g. a key pad of FIG. 1) to move the pointer 21 to a position where the detection of the video signal level 23 is requested in graphic data displayed in the display area 20. At this point, the signal converting means 35 performs code conversion and P/S conversion on position data corresponding to the position 21 which is specified by the specifying means 30. Thereafter, the signal converting means 35 performs control so as to transmit the converted position data (line number data and horizontal time data) from the transmitting means 31.

Further, the specifying means 30 continuously or successively outputs position data corresponding to the position 21 to the signal converting means 35 regardless of whether the specified position 21 is changed by an operation of the user. Namely, when the specified position 21 is not changed by an operation of the user, the signal converting means 35 always performs control so as to successively transmit the same position data from the transmitting means 31. On the other hand, when the specified position 21 is changed by an operation of the user, the signal converting means 35 performs control so as to successively transmit changing position data from the transmitting means 31. In this way, the signal converting means 35 performs control so as to successively transmit position data from the transmitting means 31, so that the pointer 21 can be moved in displayed data in real time (can be displayed by the display means 33 in real time) in synchronization with the specifying means 30 operated by the user.

When the user of the display device 10 desires to enlarge or reduce the graphic data 22 displayed in the display area 20, the user operates the input means 25 (e.g., the key pad of FIG. 1) to have a desired magnification. At this point, the input means 25 outputs magnification data (e.g., data for increasing a magnification by a factor of one, or data for reducing a magnification by a factor of one) to the transmitting means 31. The transmitting means 31 transmits transmission data such as position data and magnification data successively or in real time to the measuring instrument 50 by wireless. The transmitting means 31 comprises, for example, an SS (Spectrum Spread) transmitter and an antenna. For example, the SS transmitter performs spread coding on transmission data according to the direct spread system or the like and transmits the transmission data, which has been subjected to spread coding, in a 2.4 GHz frequency band to the measuring instrument 50 via the antenna.

The receiving means 61 of the measuring instrument 50 (e.g., a waveform monitor) receives transmission data such as position data and magnification data successively or in real time from the display device 10 by wireless. The receiving means 61 comprises, for example, an SS receiver and an antenna. The SS receiver decodes the transmission data which has been subjected to spread coding and outputs the decoded transmission data to the control means 51 of the measuring section 57.

The control means 51 (e.g., a CPU) is fed with position data and magnification data from the receiving means 61 and graphic data from the signal processing circuit 52. The control means 51 generates pointer data corresponding to the position 21, which is specified in graphic data, in real time based on position data (line number data and horizontal time data), and the control section 51 outputs the generated pointer data (e.g., image data indicating "+" mark with the position 21 as the center) to an RGB output circuit of the image processing means 53 in real time.

Moreover, the control means 51 determines display magnification data based on magnification data and outputs the display magnification data and position data to a resolution converting LSI of the image processing means 53. At this point, for example, when the magnification data is data for increasing a magnification by a factor of one and the current display magnification data is "a factor of one", the control means 51 determines that the display magnification data is "twofold".

Besides, the control section 51 detects the video signal level 23 (RGB value and/or YCbCr value) of graphic data corresponding to line number data and horizontal time data in real time, generates video signal level data (e.g., character data) corresponding to the detected video signal level 23 in real time, and outputs the generated video signal level data to the OSD 64 in real time.

Moreover, the control means generates display magnification data (e.g., character data) in real time and outputs the data to the OSD 64 in real time.

Besides, the video signal level 23 is, for example, a signal level (%) of each RGB color and/or each YCbCr value in one pixel of graphic data corresponding to the position 21. Alternatively, the signal level 23 is an average signal level (%) of each RGB color and/or each YCbCr value in several adjacent pixels including one pixel of graphic data corresponding to the position 21.

Further, it is preferable that the control means 51 measures the video signal level 23 in real time and decides in real time whether the video signal level 23 is within a predetermined range. At this point, the control means 51 decides, for example, whether or not each color has a video signal level (%) within a range of a lower limit value (%) to an upper limit value (%) that are set for each color in advance. Alternatively, the control means 51 decides whether or not each color has a video signal level (%) outside the range of the lower limit value (%) to the upper limit value (%) that are set for each color in advance.

For example, the lower limit value (%) is set at a value 2% lower than the video signal level of the first shooting, and the upper limit value (%) is set at a value 2% higher than the video signal level of the first shooting. To be specific, when the first shooting has a video signal level of R:98%, G:54%, and B:98% on the position of a "+" mark (a violet petal) corresponding to reference numeral 71 of FIG. 7a, the tolerance of R is set at 96 to 100%, the tolerance of G is set at 52 to 56%, and the tolerance of B is set at 96 to 100%. On the position of a "+" mark (a yellow green stem) corresponding to reference numeral 72 of FIG. 7a, when the first shooting has a video signal level of R:47%, G:84%, and B:30%, the tolerance of R is set at 45 to 49%, the tolerance of G is set at 82 to 86%, and the tolerance of B is set at 28 to 32%.

Thereafter, the control means 51 generates decision data (for example, character data indicating "OK" when a video signal level is within the predetermined range, character data indicating "NG" when a video signal level is not within the predetermined range) in real time. The decision data indicates whether the video signal level 23 of each color is within the predetermined range. Then, the control section 51 outputs the generated decision data to the OSD 64 in real time.

The signal processing circuit 52 is fed with a video output signal in, for example, the SDI (Serial Digital Interface) format in real time from the video camera for shooting an object. The signal processing circuit 52 performs RGB processing on the video output signal and outputs graphic data in the PIC data format (e.g., 720×480) in real time to the control means 51 and the resolution converting LSI of the image processing means 53.

The resolution converting LSI of the image processing means 53 (e.g., an XGA board) is fed with graphic data from the signal processing circuit 52 and display magnification data and position data from the control means 51 in real time. The resolution converting LSI properly converts a resolution of graphic data based on display magnification data and position data. At this point, for example, when display magnification data is "a factor of one", the resolution converting LSI outputs inputted graphic data as it is to the RGB output circuit of the image processing means 53 in real time. Alternatively, when the display magnification data is "twofold", the resolution converting LSI changes the resolution of graphic data so that enlargement can be made twofold around the position 21 (pointer 21), and the resolution converting LSI outputs the changed graphic data to the RGB output circuit.

The RGB output circuit of the image processing means 53 is fed with graphic data from the resolution converting LSI and pointer data from the control means 51 in real time. The RGB output circuit generates synthetic graphic data of NTSC timing in real time that includes graphic data and pointer data, and the RGB output circuit outputs the generated synthetic graphic data to the NTSC encoder 63 in real time. Additionally, for example, the synthetic graphic data is generated so that the pointer 21 is disposed on the graphic data.

The NTSC encoder 63 is fed with synthetic graphic data from the RGB output circuit in real time. The NTSC encoder encodes synthetic graphic data in the NTSC format in real time and outputs the encoded synthetic graphic data (composite signal) to the OSD 64 in real time.

The OSD 64 is fed with synthetic graphic data from the NTSC encoder 63 and video signal level data, decision data, and display magnification data from the control means 51 in real time. The OSD 64 converts the video signal level data, decision data, and display magnification data into corresponding image data and superimposes the image data on the synthetic graphic data. In other words, the OSD 64 generates display data (composite signal) in real time that includes the synthetic graphic data, video signal level data, decision data, and display magnification data. For example, the display data is generated so that the video signal level 23, decision 24, and a display magnification are overlaid on the synthetic graphic data.

The transmitting means 65 of the measuring instrument 50 transmits display data (including graphic data, pointer data, video signal level data, decision data, and display magnification data) to the display device 10 in real time by wireless. The transmitting means 65 comprises, for example, an image transmitter and an antenna. Moreover, the image transmitter transmits display data in, for example, a 1.2 GHz frequency band in the FM system to the display device 10 via the antenna. Besides, by modulating display data in the FM system, it is possible to reduce the influence of noise occurring during the transmission of display data.

The receiving means 32 of the display device 10 receives display data in real time from the measuring instrument 50 by wireless. The receiving means 32 comprises, for example, a video receiver and an antenna. The video receiver outputs received display data to the display means 33.

As shown in FIG. 1, the display means 33 (e.g., an LCD video monitor) visualizes display data and provides real-time display of the image 22, the video signal level 23, the pointer 21, the decision 24, and a display magnification in the display area 20.

In this way, according to the display device 10 of the present invention, it is possible to use the function of the waveform monitor by wireless. Namely, the display device 10 receives, by wireless, graphic data and video signal level data that are generated by converting a video output signal from the video camera into an image and number, and the display device 10 can display the image 22 and the signal level 23. Therefore, even when a working space is small around a lighting display device, the display device 10 which is smaller than the waveform monitor can be easily brought into the working space.

Further, the display device 10 of the present invention can receive signal level data by wireless or cable and display the video signal level 23 corresponding to the pointer 21 together with the image 22. Therefore, even the unskilled user can readily confirm whether the light source of the lighting display device has a proper intensity. Consequently, the user of the display device 10 can readily adjust the light source intensity of the lighting display device while viewing the video signal level 23.

Moreover, the display device 10 of the present invention, can also display the decision 24. In this case, even the unskilled user can match the video signal level of the first shooting with the video signal level of the subsequent shooting with enhanced ease.

Furthermore, according to the display device 10 of the present invention, it is possible to receive data such as graphic data, pointer data, video signal level data, and decision data by wireless. Therefore, even when a plurality of lighting display devices are provided, the display device 10 can be readily brought into each working space. Consequently, the user of the display device 10 can readily adjust the light source intensity of the lighting display device while viewing various kinds of data.

Additionally, the display device 10 of the present invention can comprise the input means 25 which inputs a magnification for displaying graphic data. Therefore, even when the display device 10 is small, the user of the display device 10 can readily adjust the light source intensity of the lighting display device while viewing the enlarged image 22.

Embodiment 2

Figure 3:
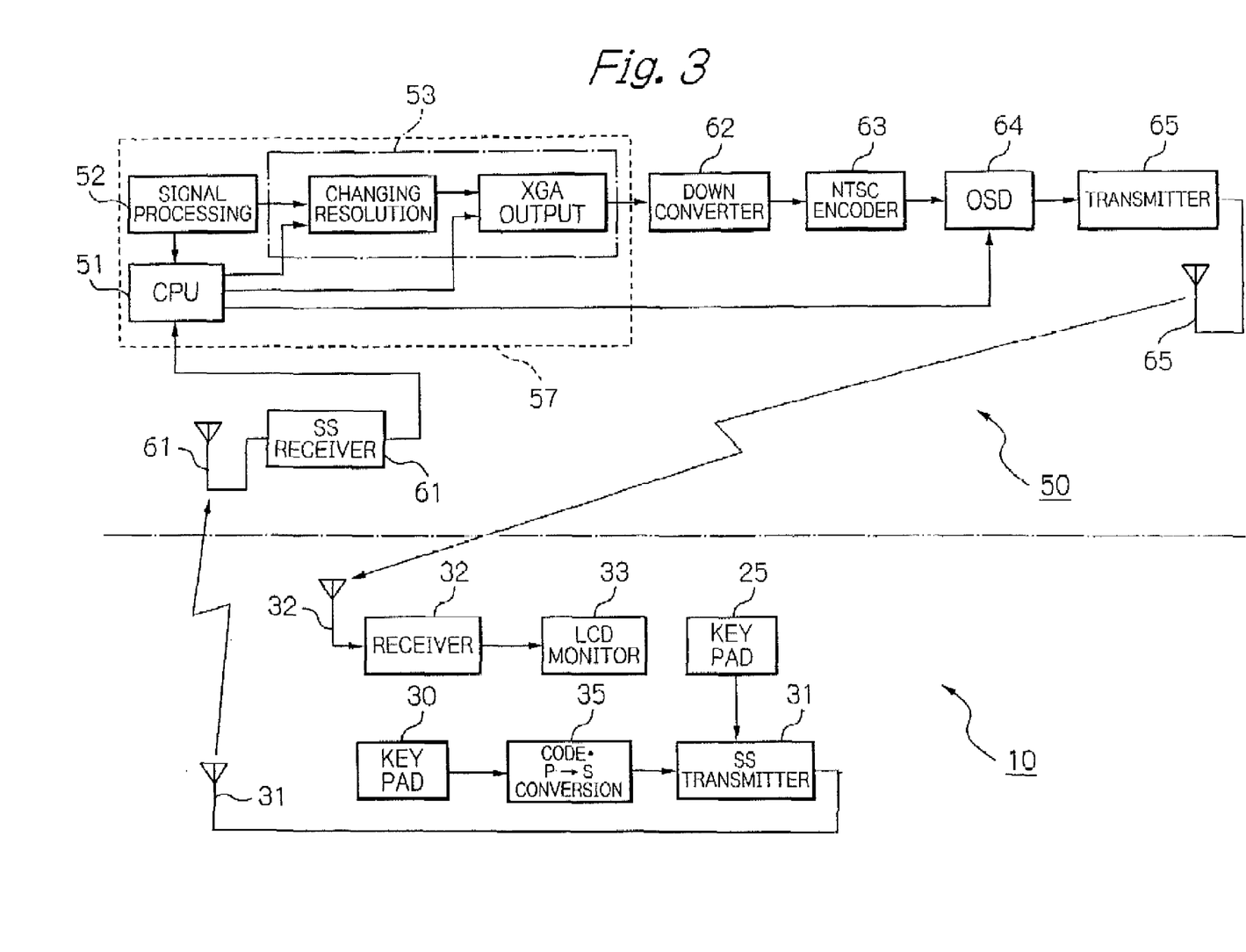
FIG. 3 is a diagram showing a modification of the functional blocks of the display device and measuring instrument shown in FIG. 2.

FIG. 3 is a diagram showing a modification of the functional blocks of the display device and measuring instrument shown in FIG. 2. When a video output signal from a video camera is in a HDTV (High Definition Television) format, as shown in FIG. 3, a measuring instrument 50 comprises a down converter 62 between image processing means 53 and an NTSC encoder 63. Moreover, the image processing means 53 of the measuring instrument 50 comprises an RGB output circuit of XGA timing instead of an RGB output circuit of NTSC timing. The following will describe operations different from those of the display device 10 and measuring instrument 50 shown in FIG. 2.

A signal processing circuit 52 is fed with a video output signal of the HDTV format. The signal processing circuit 52 performs RGB processing on the video output signal of the HDTV format and outputs graphic data of a PIC data format (1024×768) to a resolution converting LSI of the image processing means 53 in real time.

The RGB output circuit of the image processing means 53 outputs synthetic graphic data of the XGA timing to the down converter 62.

The down converter 62 is fed with synthetic graphic data from the RGB output circuit of the XGA timing in the image processing means 53. The down converter 62 converts the 1024 scanning lines of the synthetic graphic data to 525 and converts a resolution of 1024 by 768 pixels to 720 by 480 pixels in the synthetic graphic data.

Embodiment 3

Figure 4:
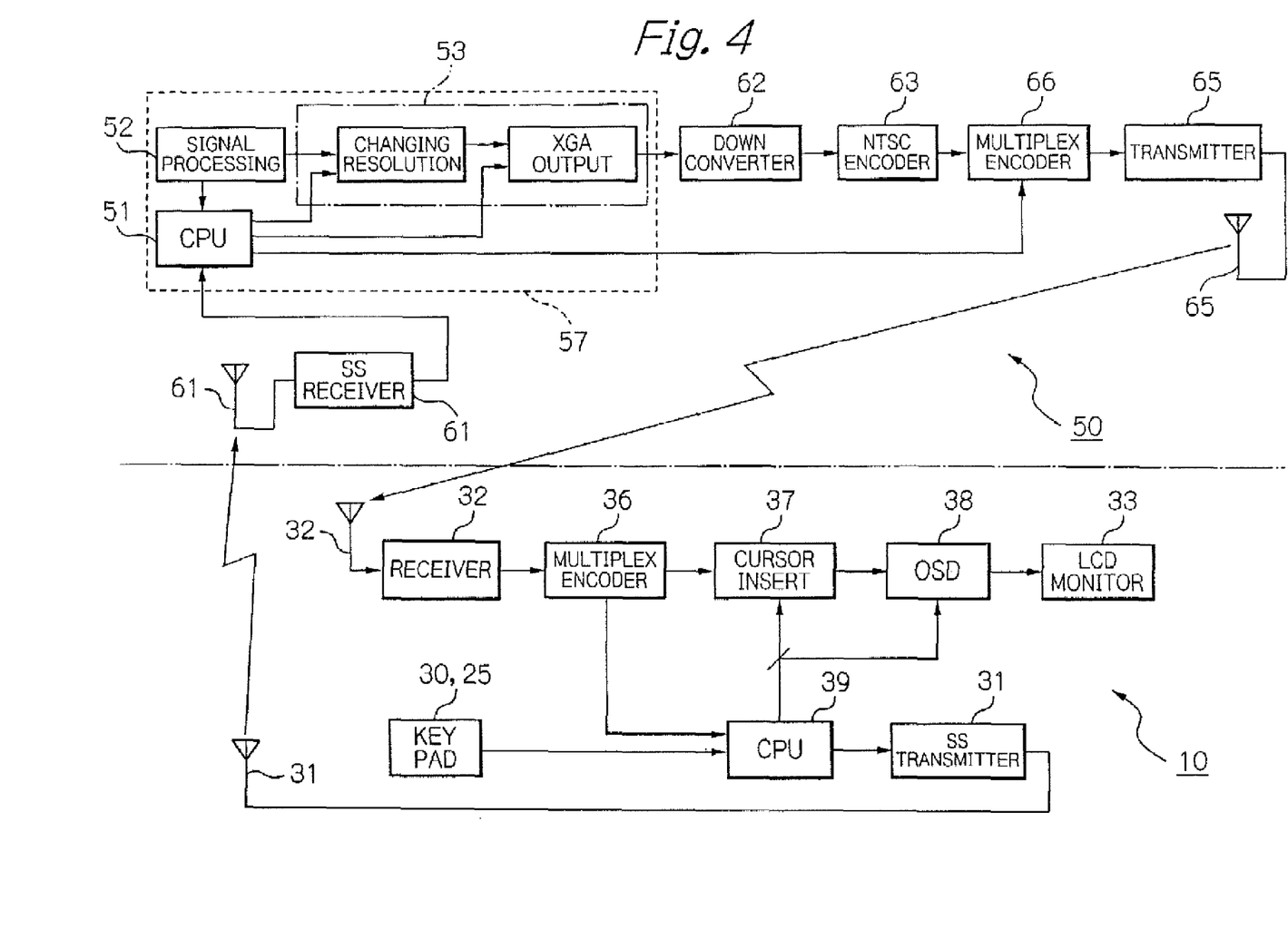
FIG. 4 is a diagram showing a modification of the functional blocks of the display device and measuring instrument shown in FIG. 3.

FIG. 4 is a diagram showing a modification of the functional blocks of the display device and measuring instrument shown in FIG. 3. When display data is generated on the side of the display device 10, as shown in FIG. 4, a measuring instrument 50 comprises a character multiplex encoder 66 instead of an OSD 64. A display device 10 comprises a multiplex decoder 36 and an OSD 38 between a video receiver 32 and an LCD video monitor. Moreover, the display device 10 comprises control means 39 for controlling the operation of the display device 10, instead of signal converting means 35. The following will describe operations different from those of the display device 10 and measuring instrument 50 shown in FIG. 3.

Control means 51 of a measuring section 57 does not generate pointer data corresponding to a position 21.

The RGB output circuit of image processing means 53 is fed with graphic data from a resolution converting LSI and outputs graphic data to a down converter 62.

A character multiplex encoder 66 is fed with graphic data from an NTSC encoder 63 and character data (video signal level data, decision data, and display magnification data) from the control means 51. The character multiplex encoder 66 multiplexes the graphic data and character data (video signal level data, decision data, and display magnification data).

The character multiplex decoder 36 of the display device 10 is fed with data from receiving means 32. The character multiplex decoder 36 divides the data into graphic data and character data (video signal level data, decision data, and display magnification data) and outputs the data to the control means 39.

The control means 39 (e.g., a CPU) generates pointer data corresponding to a position specified in graphic data. Thereafter, the control means 39 generates synthetic graphic data 37 including the graphic data and the pointer data. Further, the control means 39 outputs the synthetic graphic data 37 and character data (video signal level data, decision data, and display magnification data) to the OSD 38.

The OSD 38 generates display data so that the character data (video signal level data, decision data, and display magnification data) is overlaid on the synthetic graphic data 37.

Embodiment 4

Figure 5:
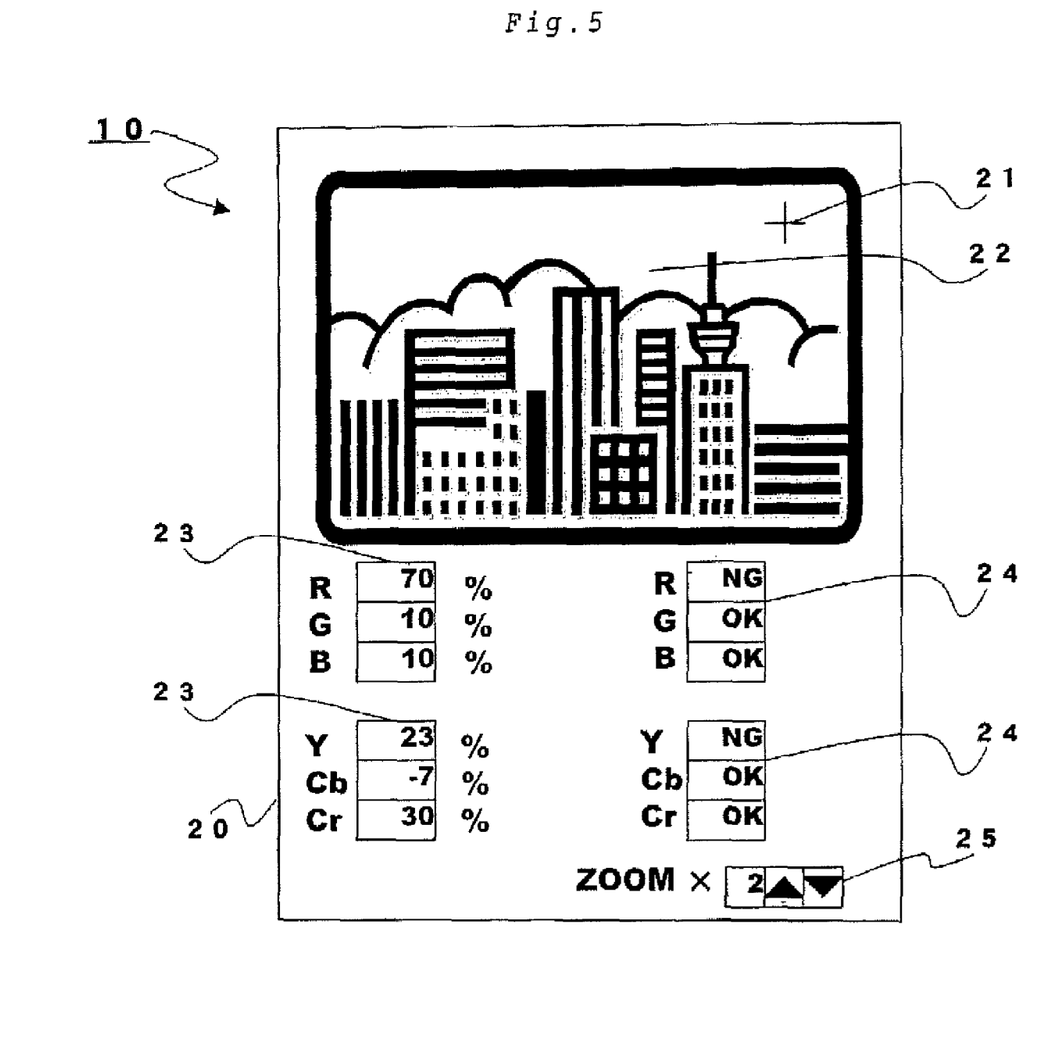
FIG. 5 is a diagram showing an example of the display area of the display device which communicates with the measuring instrument by wireless and displays a video signal level according to the present invention.
Figure 6:
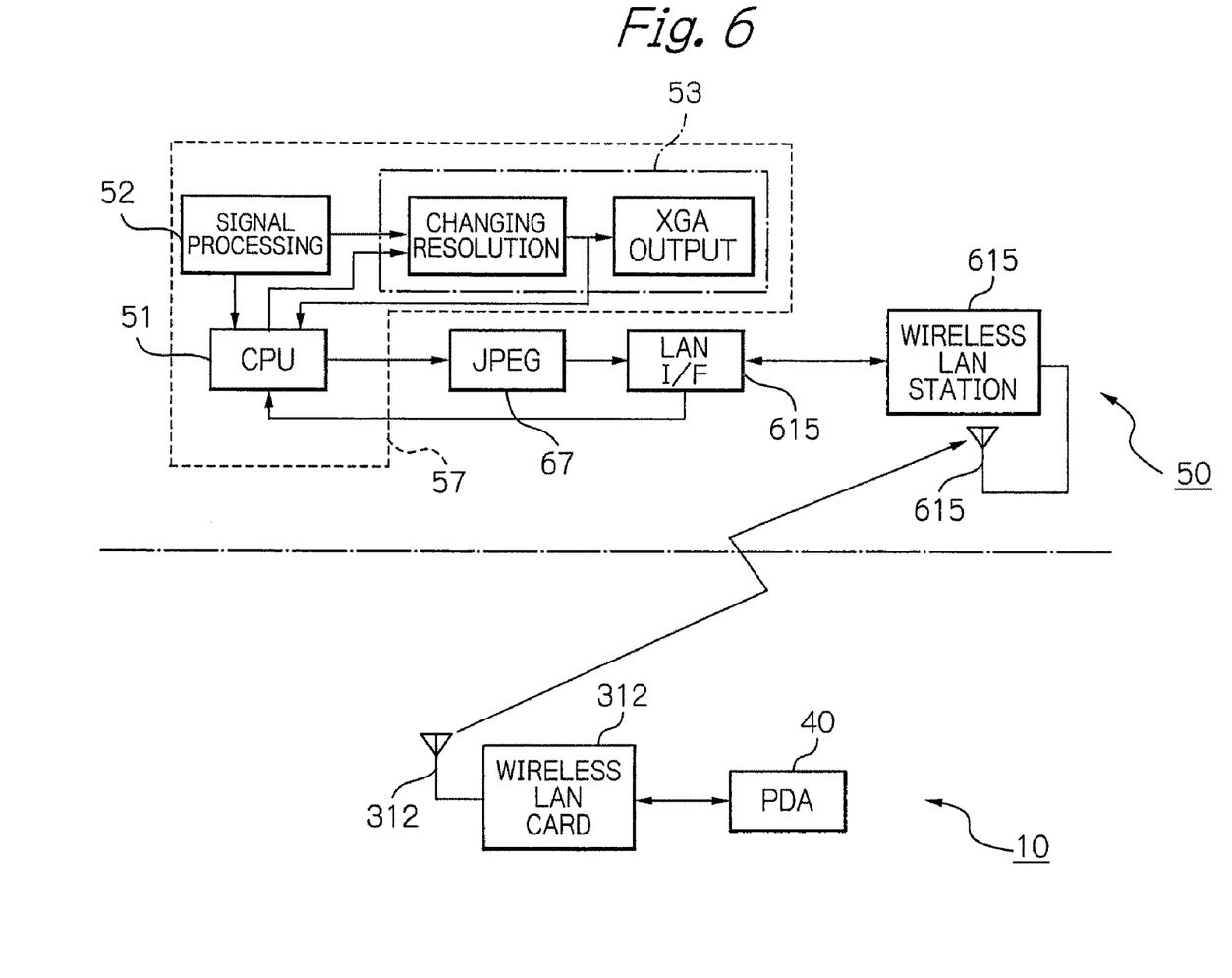
FIG. 6 is a diagram showing an example of the functional blocks of the measuring instrument and the display device for displaying a video signal level according to the present invention.

FIG. 5 is a diagram showing an example of the display area of a display device according to the present invention. The display device displays a video signal level by communicating with a measuring instrument by wireless. FIG. 6 is a diagram showing an example of the functional blocks of the display device for displaying a video signal level and the measuring instrument according to the present invention.

As shown in FIG. 6, a display device 10 for displaying a video signal level according to the present invention comprises a portable terminal 40 and communication means 312 for communicating data with a measuring instrument 50.

The terminal 40 of the display device 10 comprises a) specifying means for specifying an arbitrary position 21 of an image 22 displayed in a display area 20 and generating position data and b) display means for visualizing graphic data, video signal level data, decision data, and pointer data, and displaying the image 22, a video signal level 23, decision 24, and a pointer 21 in the display area 20. Further, the terminal 40 of the display device 10 according to the present invention comprises c) control means for controlling the operation of the display device 10. The control means generates pointer data corresponding to the position 21 specified in graphic data.

The terminal 40 may comprise d) input means 25 for specifying a magnification for displaying graphic data and generating magnification data.

The communication means 312 of the display device 10 comprises e) transmitting means for transmitting position data to the measuring instrument 50 by wireless and f) receiving means for receiving graphic data, video signal level data corresponding to the position 21, decision data, and pointer data from the measuring instrument 50 by wireless.

As shown in FIG. 6, the measuring instrument 50 comprises: a') control means 51 for controlling the operation of the measuring instrument 50; b') a signal processing circuit 52 which is fed with a video output signal including a luminance signal and a color-difference signal from a video camera (not shown) for shooting an object, performs RGB processing on the video output signal, and outputs graphic data; and c') image processing means 53 for properly converting a resolution of graphic data as necessary by enlargement or the like to generate graphic data in an RGB data format. A measuring section 57 includes the control means 51, the signal processing circuit 52, and the image processing means 53.

The measuring instrument 50 further comprises d') communication means 615 for communicating data such as position data and magnification data with the display device 10.

The following will specifically describe the operations of the display device 10 and the measuring instrument 50 according to the present invention. First, the user of the display device 10 operates the specifying means (e.g., a touch panel monitor, a key pad, and so on) of the terminal 40 (e.g., PDA (Personal Data Assistant)) so as to move the pointer 21 to a position where the detection of the video signal level 23 is requested in graphic data displayed in the display area 20. At this point, for example, the user of the display device 10 presses, with a finger or a touch pen, a point on the image 22 displayed on the touch panel monitor (display means) of the PDA 40 to specify the position 21. Alternatively, the user of the display device 10 moves the pointer 21 from one point to another with a key pad and specifies the position 21 by stopping the pointer 21 in the image 22 displayed on the display means of the PDA 40.

The control means (e.g., a CPU) of the terminal 40 performs control so as to transmit position data corresponding to the position 21 from the communication means 312 every time the position 21 is specified (for example, every time the touch panel monitor is pressed once or the pointer 21 stops moving).

As shown in FIG. 5, when the user of the display device 10 requires "twofold" as a zoom magnification (display magnification), "▲" of the input means 25 is pressed once. At this point, the control means of the terminal 40 performs control so as to transmit magnification data (data for increasing a magnification by a factor of one), which has been received from the input means 25, from the communication means 312 together with position data.

Communication means 312 comprises, for example, a wireless LAN card and an antenna. The wireless LAN card is compliant with, for example, an "IEEE 802.11b" standard.

Communication means 615 of the measuring instrument 50 receives transmission data such as position data and magnification data from the display device 10 by wireless. The communication means 615 comprises, for example, a wireless LAN station and an antenna. The wireless LAN station is compliant with, for example, the "IEEE 802.11b" standard.

The control means 51 (e.g., a CPU) of the measuring instrument 50 is fed with position data and magnification data from the communication means 615 and graphic data from the signal processing circuit 52. The control means 51 generates, based on position data, pointer data corresponding to the position 21 specified in graphic data. Further, the control means 51 detects the video signal level 23 (RGB value and/or YCbCr value) corresponding to the position 21 specified in graphic data. Moreover, the control means 51 decides whether or not the video signal level 23 is within a predetermined range, and generates decision data. Additionally, the control means 51 determines display magnification data based on magnification data and outputs the display magnification data and position data to a resolution converting LSI of the image processing means 53.

The signal processing circuit 52 is fed with a video output signal in, for example, a SDI format from a video camera for shooting an object. The signal processing circuit performs RGB processing and outputs graphic data of the PIC data format (e.g., a resolution of 214 by 160 pixels) to the control means 51 and the resolution converting LSI of the image processing means 53.

The resolution converting LSI of the image processing means 53 properly converts a resolution of graphic data based on display magnification data and position data, and outputs converted graphic data to the control means 51 of the measuring instrument 50.

The control means 51 of the measuring instrument 50 is fed with graphic data from the resolution converting LSI.

The control means 51 generates display data including graphic data, whose resolution has been properly converted, video signal level data, decision data, pointer data, and display magnification data.

In this case, the display data is preferably provided in a Web contents data format (data analyzable and displayable by a Web browser). Namely, display data includes, for example, synthetic graphic data 67 (image data) of a JPEG format and numerical data including video signal level data, decision data, and display magnification data. The synthetic graphic data 67 has superimposed graphic data and pointer data. Alternatively, display data may be synthetic graphic data (image data) of a JPEG format on which graphic data, pointer data, video signal level data, decision data, and display magnification data are superimposed.

The communication means 615 of the measuring instrument 50 transmits display data to the display device 10 by wireless.

The communication means 312 of the display device 10 receives display data from the measuring instrument 50 by wireless.

The display means (e.g., a touch panel monitor and an LCD video monitor) held by the terminal 40 of the display device 10 visualizes display data.

Besides, it is also possible to generate pointer data on the side of the control means of the terminal 40 to generate other display data including display data and pointer data.

In the display device 10 of the present invention, it is preferable to use a Web browsing function to transmit and receive data via the communication means and visualize the data with the display means. For example, by using a PDA as the terminal 40 having the Web browsing function, the display device 10 for displaying a video signal level can be provided with a small size and a light weight. Therefore, even when a working space is small around the lighting display device, the display device 10 with a smaller size and a lighter weight than a waveform monitor can be readily brought in the working space. Consequently, the user of the display device 10 can readily adjust the light source intensity of the lighting display device.

Other Embodiment

The display device 50 and measuring instrument 10 described in Embodiments 1 to 4 can be integrated with each other. Namely, the measuring instrument 10 may comprise the specifying means 30 of the display device 50. The user specifies, via the specifying means, one point on an image displayed on the display means of the measuring instrument, so that the measuring instrument displays the image and a video signal level on the display means of the measuring instrument.

It should be understood that the display device 50 and measuring instrument 10 according to the present invention are not limited to the plurality of illustrated examples described above, but may be modified in various manners without departing from the spirit of the invention.

What is claimed is:

1. A measuring method for measuring a video signal level, the measuring method comprising the step of:
    a) receiving a video output signal including a luminance signal and a color-difference signal from a video camera for shooting an object, and performing RGB processing on the video output signal to generate graphic data,
    b) measuring a video signal level on a position specified in the graphic data, and generating video signal level data, said video signal level being obtained from said graphic data, and
    c) generating display data including the graphic data and the video signal level data.

2. The measuring method according to claim 1, further comprising:
    d) receiving position data corresponding to the position from a display device for displaying a video signal level, and
    e) transmitting the display data to the display device.

3. The measuring method according to claim 2, wherein the position data in the step of d) are received wirelessly, and the display data in the step of e) are transmitted wirelessly.

4. The measuring method according to claim 1, further comprising f) deciding whether the video signal level is within a predetermined range and generating decision data, and wherein the display data generated in the step of c) further include the decision data.

5. The measuring method according to claim 4, wherein the video signal level data generated in the step of b) are made up of video signal level data of red, green, and blue, and the decision data generated in the step of f) are made up of decision data of red, green, and blue.

6. The measuring method according to claim 4, wherein the video signal level data generated in the step of b) include at least a luminance or color-difference component, and the decision data generated in the step of f) include at least a luminance or color-difference component.

7. The measuring method according to claim 2, wherein the display data generated in the step of c) are in a Web contents data format, and the display data transmitted in the step of e) are in the Web contents data format.

8. The measuring method according to claim 1, further comprising g) generating pointer data corresponding to a position specified in the graphic data, wherein the display data generated in the step c) further include the pointer data.

9. The measuring method according to claim 1, further comprising h) enlarging or reducing the graphic data under a magnification corresponding to specified magnification data, the graphic data being generated in the step a), wherein the display data generated in the step c) include enlarged or reduced graphic data.

10. A displaying method for displaying a video signal level, the display device, comprising:
    a) receiving display data including graphic data and video signal level data from a measuring instrument for measuring a video signal level, where said video signal level being obtained from said graphic data,
    b) visualizing the display data and displaying an image and a video signal level,
    c) specifying a position in the displayed image and generating position data, and
    d) transmitting the position data to the measuring instrument.

11. The displaying method according to claim 10, wherein the display data are received wirelessly in the step a), and the position data are transmitted wirelessly in the step d).

12. The displaying method according to claim 10, wherein the display data received in the step a) further include decision data indicating whether the video signal level is within a predetermined range, and the display data visualized in the step b) further include the decision data.

13. The displaying method according to claim 12, wherein the display data received in the step a) include the video signal level data and the decision data, the video signal level data being made up of video signal level data of red, green, and blue, and the decision data being made up of decision data of red, green, and blue, and the display data visualized in the step b) include the video signal level data made up of video signal levels of red, green, and blue and a decision made up of decisions of red, green, and blue.

14. The displaying method according to claim 12, wherein the display data received in the step a) include the video signal level data and the decision data, the video signal level data including at least a luminance or color-difference component, and the decision data including at least a luminance or color-difference component, and the display data visualized in the step b) include the video signal level data including at least a luminance or color-difference component and a decision including at least a luminance or color-difference component.

15. The displaying method according to claim 10, wherein the display data received in the step a) are in a Web contents data format, and the display data are visualized by using a Web browsing function in the Web contents data format in the step b).

16. The display device according to claim 10, further comprising e) generating pointer data corresponding to a position specified in the graphic data, and generating the display data further including the pointer data.

17. The displaying method according to claim 10, further comprising f) specifying a magnification for enlarging or reducing an image and generating magnification data, wherein the step of d) further comprising transmitting the magnification data to the measuring instrument, and the display data received in the step of a)includes enlarged or reduced graphic data from the measuring instrument.

* * * * *